(12) United States Patent
Cardon

(10) Patent No.: US 7,618,018 B2
(45) Date of Patent: Nov. 17, 2009

(54) ASSEMBLY COMPRISING ELECTRICALLY OPERATED VALVE, AND PROCESS FOR ASSEMBLING A SOLENOID ON A HOUSING OF THE VALVE

(75) Inventor: Christophe Cardon, Paris (FR)

(73) Assignee: Delphi Technologies, Inc., Troy, MI (US)

( * ) Notice: Subject to any disclaimer, the term of this patent is extended or adjusted under 35 U.S.C. 154(b) by 634 days.

(21) Appl. No.: 11/339,287

(22) Filed: Jan. 25, 2006

(65) Prior Publication Data

US 2006/0118747 A1 Jun. 8, 2006

(51) Int. Cl.
*F16K 31/02* (2006.01)
(52) U.S. Cl. .................. 251/129.15; 251/900
(58) Field of Classification Search ............ 251/129.15, 251/129.01, 900
See application file for complete search history.

(56) References Cited

U.S. PATENT DOCUMENTS

| | | | | |
|---|---|---|---|---|
| 2,614,584 A | * | 10/1952 | Goepfrich | 251/129.21 |
| 4,067,541 A | * | 1/1978 | Hunter | 251/129.15 |
| 4,610,080 A | * | 9/1986 | Hensley | 251/129.1 |
| 5,100,100 A | * | 3/1992 | Benson et al. | 251/129.06 |
| 5,497,975 A | * | 3/1996 | Achmad | 251/129.07 |
| 5,556,175 A | * | 9/1996 | Hayakawa et al. | 251/129.02 |
| 6,546,945 B2 | * | 4/2003 | Ishigaki et al. | 251/129.15 |
| 2003/0030019 A1 | * | 2/2003 | Sato et al. | 251/129.15 |
| 2005/0218364 A1 | * | 10/2005 | Ohi et al. | 251/129.15 |
| 2005/0224740 A1 | * | 10/2005 | Hirota | 251/129.19 |

FOREIGN PATENT DOCUMENTS

EP 0 538 986 6/1992
EP 1 036 973 2/2000

OTHER PUBLICATIONS

PCT Written Opinion of the International Searching Authority, (2006).

* cited by examiner

*Primary Examiner*—John Bastianelli
(74) *Attorney, Agent, or Firm*—Thomas N. Twomey

(57) ABSTRACT

The electromagnetic valve comprises a cylindrical housing and a solenoid having an axial hole capable of receiving one of the ends of the housing that is associated with a split ring capable of being placed in a first circular recess on the periphery of the housing for extending partially and simultaneously in a second circular recess on the inner surface of the axial hole of the hole forming a port in such a manner as to establish a connection between the housing and the solenoid and the hole forming a port. An elastically compressible intermediate ring is placed around the housing and capable of being compressed between opposing support surfaces.

11 Claims, 3 Drawing Sheets

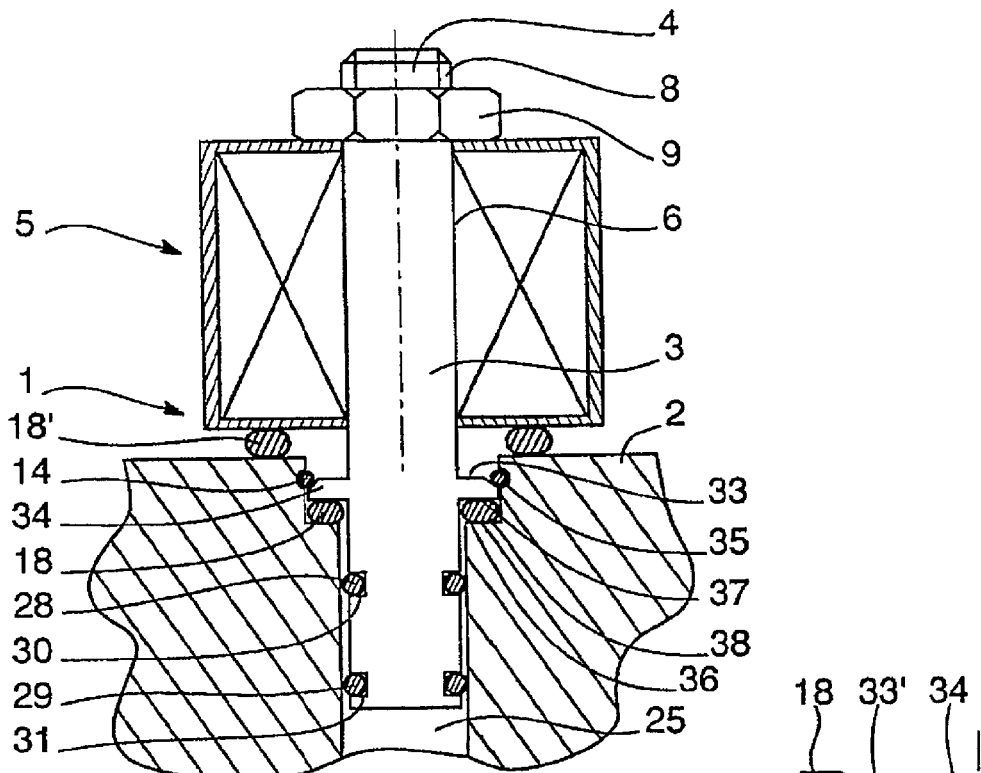
FIG.7
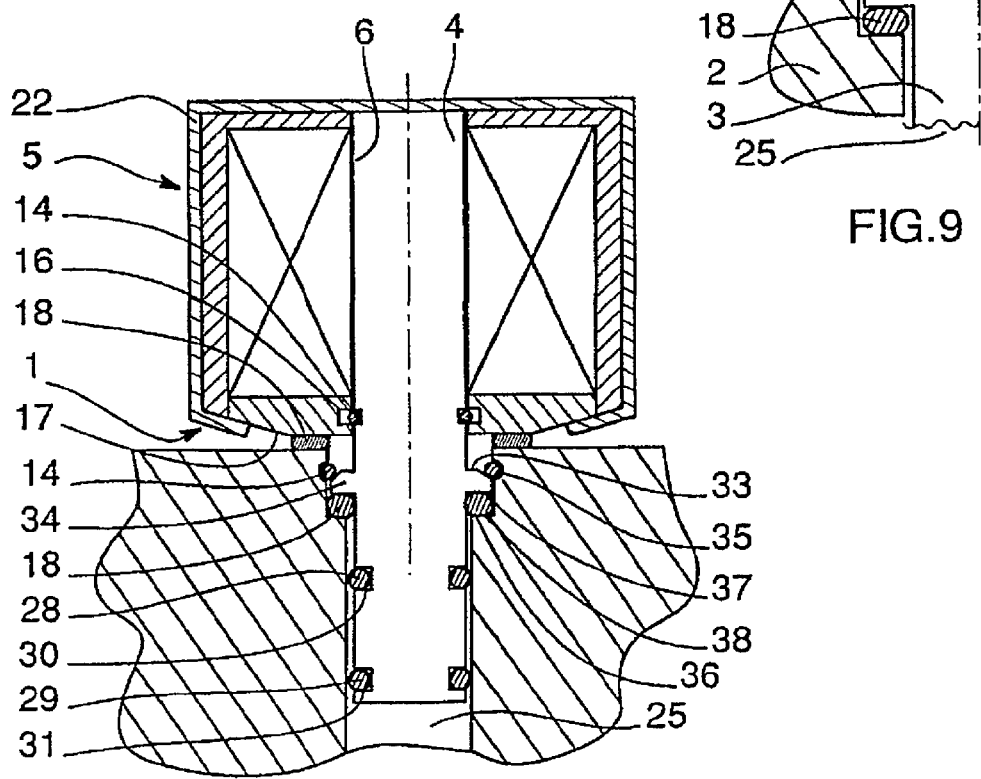
FIG.9
FIG.8

ASSEMBLY COMPRISING ELECTRICALLY OPERATED VALVE, AND PROCESS FOR ASSEMBLING A SOLENOID ON A HOUSING OF THE VALVE

BACKGROUND OF INVENTION

The present invention relates to an electrically operated valve, in particular of the type used in a hydraulic unit mounted in a motor vehicle.

The invention also relates to a process for fitting a solenoid on the electrically operated valve, and a process for removing the solenoid from the electrically operated valve.

These electrically operated valves generally include a substantially cylindrical housing provided with a collar forming a stop for a solenoid which is mounted at one of the ends of the electrically operated valve. The solenoid is provided with an axial hole receiving this end of the electrically operated valve when these two elements are assembled. The solenoid can thus be axially displaced along this end to abut against this collar. The electrically operated valve also includes first connecting means of the housing to the solenoid when it is in abutment against the collar, and second connecting means of the housing to the inside of a hole forming a port in the hydraulic unit.

The invention relates in particular to these first connecting means which simultaneously form means for axial locking of the solenoid in its service position on the valve housing. The electrically operated valve as such will not be described in detail since it is well known to the man skilled in the art. First and second connecting means associated with the housing of an electrically operated valve are known. Two embodiments generally used are illustrated in FIGS. 1, 2 respectively.

In FIG. 1 which shows very diagrammatically an electrically operated valve of the type described in the document EP 0 538 986. The electrically operated valve 1 is shown in its installed position in a hydraulic unit 2. The details of the inside of the valve are not shown, since they do not directly relate to the invention. The electrically operated valve 1 includes a substantially cylindrical housing 3 one (4) of the ends of which is shown in FIG. 1. A solenoid 5 includes a through axial hole 6 receiving the end 4 of the electrically operated valve 1. The solenoid 5 is in abutment against a collar 7 provided on the periphery of the housing 3 and is locked there in a service position by means of axial locking means.

In the example shown in FIG. 1, these means for axially locking the solenoid 5 include a thread 8 at the tip of the end 4 of the housing 3 which co-operates with a nut 9 screwed onto the end 4 and tightened against an end surface of the solenoid so as to bias the end surface opposite to this against the collar 7. The thread 8, with the tapping of the nut 9, forms the first connecting means to connect these two elements together.

The housing 3 is provided over a part of its length with a second thread 23 which co-operates with a tapping 24 provided in a hole forming a port 25 in the hydraulic unit 2. The thread 23, with the tapping 24, forms second connecting means to connect the electrically operated valve 1 to the hydraulic unit 2. The collar 7 has a hexagonal shape in order to allow screwing of the electrically operated valve 1 into the hydraulic unit by means of a tool (not shown).

In the example shown in FIG. 1, a first sealing ring 26 is arranged in a conical cavity 27 around the opening of the hole forming a port 25 on the face of the hydraulic unit 2. A second sealing ring 28 and a third sealing ring 29 are arranged in a groove 30, 31 respectively on the periphery of the housing 3 of the electrically operated valve 1.

FIG. 2 shows an electrically operated valve 1 which differs from that described with reference to FIG. 1 only by the fact that it includes another type of means for connecting or axially locking the solenoid 5 relative to the housing 3 of the electrically operated valve 1. The other elements being the same, they have retained their reference numbers and will not be described further.

The axial locking means shown in FIG. 2 include a flange 10 at one of the ends of the solenoid, this flange being provided with a plurality of through holes 11 receiving a respective fixing screw 12 which can be screwed into a respective tapped hole 13 provided in the hydraulic unit. The flange 10 is thus tightened against the hydraulic unit, biasing the solenoid 5 against the collar 7 of the valve housing 3.

Instead of the flange, lugs could also be used provided with a hole in place of the flange 10. These lugs could be four in number and uniformly spaced around the periphery of the solenoid 5.

However, these known solutions, in particular for these first connecting means, are bulky and costly to use. Moreover, they require anti-corrosion treatment of the part of the electrically operated valve which is exposed to the environment.

SUMMARY OF THE INVENTION

The aim of the invention is to remedy these disadvantages by proposing an electrically operated valve provided with connecting means, on the one hand between the solenoid and the housing and on the other between the housing and the hydraulic unit, permitting very simple and inexpensive fitting of the solenoid onto the valve housing, and of the latter onto the hydraulic unit, and a better seal to be obtained rendering the anti-corrosion treatment unnecessary.

The object of the invention is an electrically operated valve including a substantially cylindrical housing and a solenoid having an axial hole able to receive one of the ends of the housing, the housing being associated with first connecting means of the housing to the solenoid so as to form an assembly and with second connecting means of the housing to a hole forming a port in an hydraulic unit, characterised by the fact that the first and/or second connecting means include a split ring able to be arranged in a first circular cavity provided on the periphery of the housing to extend partially and simultaneously into a second circular cavity provided on the inside face of the axial hole in the solenoid and/or of the hole forming a port so as to form a connection between on the one hand the housing and on the other the solenoid and/or the hole forming a port, and by the fact that the first and/or the second connecting means are associated with at least one elastically compressible intermediate ring arranged around the housing and able to be compressed between first and second opposed contact surfaces positioned one facing the other, the first and second contact surfaces being provided on the solenoid-housing assembly and/or on this assembly and on the hydraulic unit.

In accordance with other characteristics of the invention:
  one of the first and second contact surfaces is provided on
    the solenoid around the axial hole in this and the other on
    a collar of the housing;
  one of the first and second contact surfaces is provided on
    a collar of the housing able to be introduced into the hole
    forming a port in the hydraulic unit and the other on an
    annular shoulder in the hole forming a port;
  a second elastically compressible intermediate ring is
    arranged around the housing and able to be compressed between first and second opposed contact surfaces positioned one facing the other, one of the first and second contact surfaces being provided on the solenoid, around the axial hole in this, and the other on the hydraulic unit, around the hole forming a port in this;

the first circular cavity is defined on one of the faces of the collar of the housing;

the first circular cavity is defined by a groove on the peripheral face of the collar of the housing;

the locking means are associated with an elastically compressible intermediate ring arranged around the housing, between the collar and an annular contact surface around the axial hole in the solenoid;

the split ring is a metal ring;

the split ring has a circular section;

the thickness of the wall separating the second groove from the corresponding end face of the solenoid is sufficiently thin to allow removal of the solenoid by forcing it outwardly so as to deform the wall by means of the split ring;

the end surface of the solenoid turned towards the collar is generally in the form of a truncated cone and able to co-operate with a wedge;

the solenoid is covered on all sides by a protective casing;

the casing is made of a malleable a magnetic metal and has a generally cylindrical tubular shape, closed at one of its ends and crimped on the solenoid at the opposite end;

the casing is made of a plastics material over-moulded on the solenoid.

In accordance with the process of the invention for fitting a solenoid to the valve defined above, the split ring is placed in one or the other of the first and second grooves on the housing or on the inside face of the axial hole in the solenoid, respectively, this axial hole is aligned with the end of the valve housing, this end is introduced into the axial hole and the solenoid is pushed to axially displace it towards the collar forming a stop on the housing, deforming the split ring elastically in a radial direction to retract it into the groove until the first and second grooves come opposite each other to allow the split ring to readopt its original shape extending simultaneously into the two grooves.

In accordance with another characteristic of fitting, the intermediate ring is compressed to eliminate any axial play of the solenoid on the housing when the first and second grooves are arranged opposite each other.

In accordance with yet another characteristic of fitting, the elastically compressible intermediate ring is sufficiently compressed between the collar and an annular contact surface on an end face of the solenoid to simultaneously form a means for locking this in rotation around the valve housing.

In accordance with the process of the invention for removal of a solenoid from the valve defined above, a tool in the form of a wedge is introduced between the end surface of the solenoid and the hydraulic unit and the wedge is driven in horizontally to create a vertically acting force component to displace the solenoid outwardly deforming the wall by means of the split ring which is axially locked in the first and second grooves.

BRIEF DESCRIPTION OF DRAWINGS

Other characteristics and advantages of the invention will become apparent from the following description of a non-limiting embodiment of the invention, with reference to the attached figures in which:

FIG. 7 is a view in diagrammatic section showing a second embodiment of the invention;

FIG. 8 is a view in diagrammatic section showing a modification with a combination of the first and second embodiment of the invention;

FIG. 9 is a partial view in diagrammatic section showing a modification of the second embodiment.

In the figures, identical or equivalent elements will bear the same reference signs.

DETAILED DESCRIPTION OF INVENTION

Figure 1:
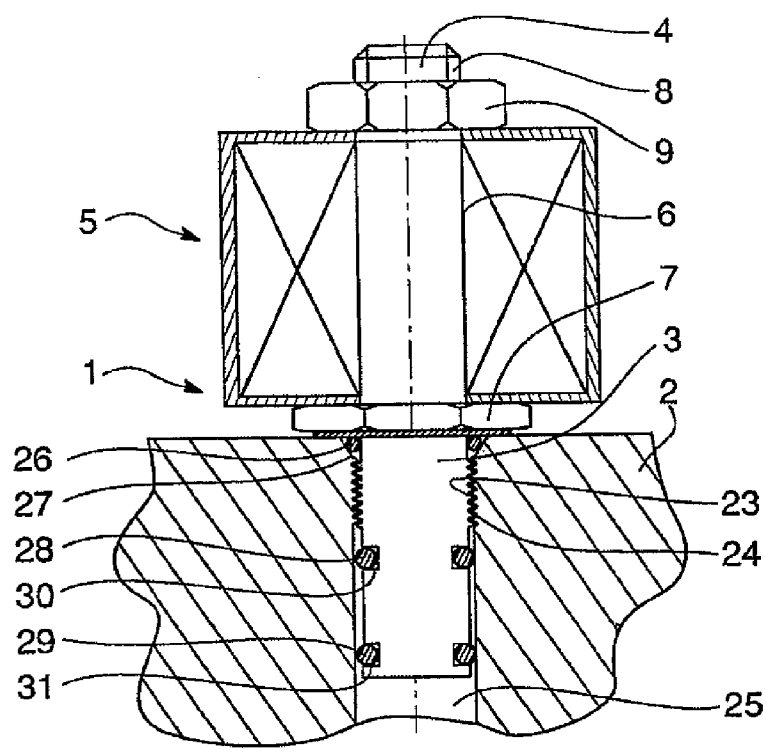
FIGS. 1 and 2 are views in diagrammatic axial section of two known embodiments described in the introduction.
Figure 2:
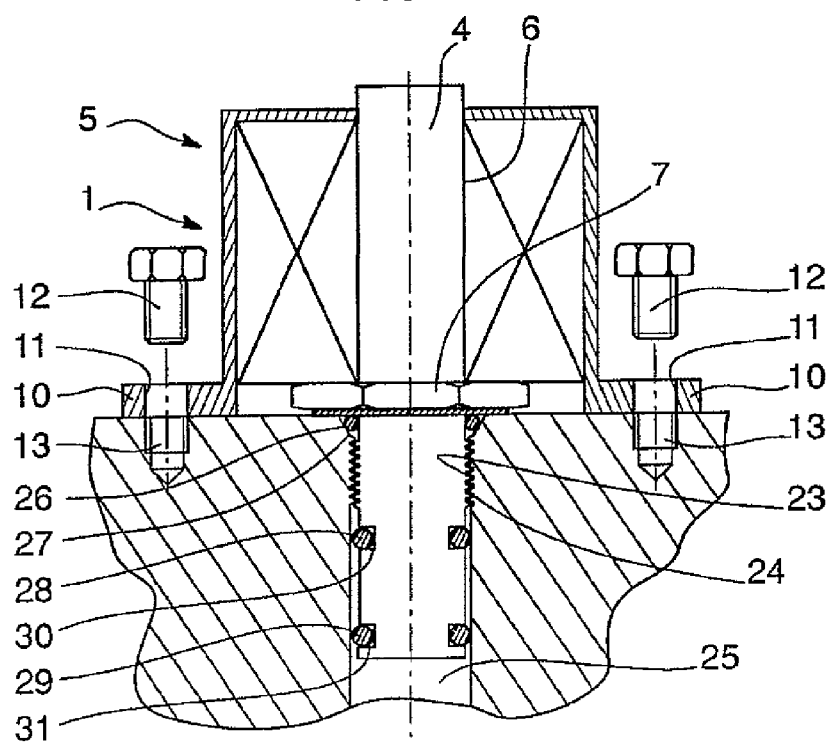
Figure 3:
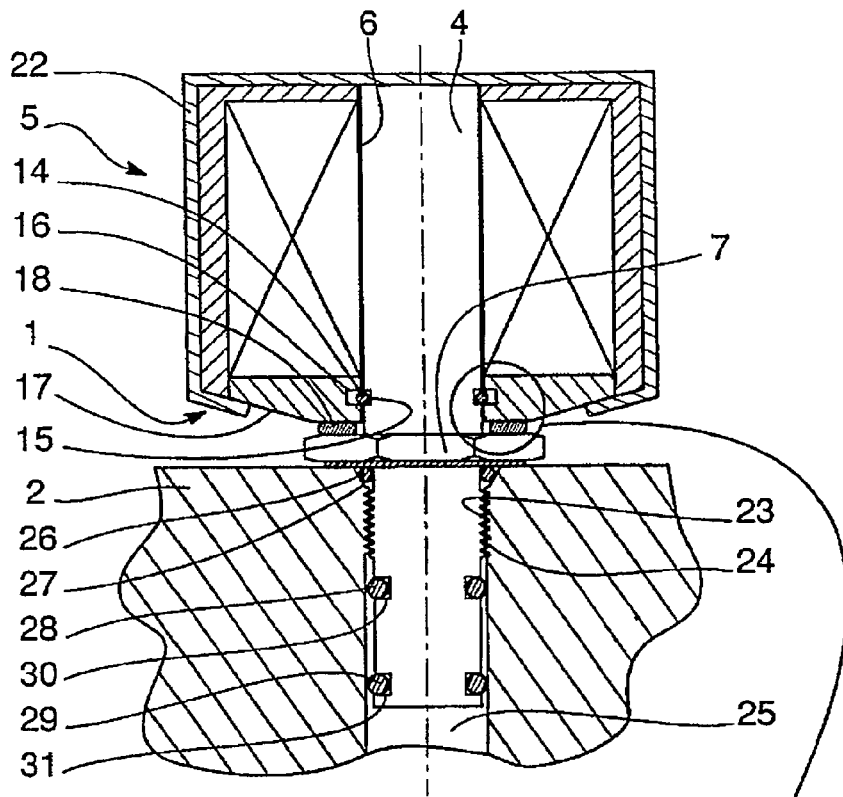
FIG. 3 is a view in diagrammatic section showing an embodiment of the invention.

As in FIGS. 1 and 2, the electrically operated valve 1 of FIG. 3 is shown in its position installed in a hydraulic unit 2. Here too, the details of the inside of the valve are not shown since they do not directly relate to the invention. The electrically operated valve 1 includes a substantially cylindrical housing 3 one (4) of the ends of which is shown in FIG. 3 inserted in the axial hole in the solenoid 5, while its opposite end, which carries a thread 23, is screwed into the hole forming a port 25 in the hydraulic unit 2.

The solenoid 5 is in abutment against a collar 7 of hexagonal shape provided on the periphery of the housing 3 and is locked there in a service position by means of first connecting means which also form axial locking means.

In accordance with an important characteristic of the invention, these first means for connecting the solenoid 5 to the housing 3 of the electrically operated valve 1 so as to form an assembly. These first connecting means include a split ring 14 made from a slightly elastic material. This ring is able to extend into a first circular cavity in the form of a groove 15 on the periphery of the housing and partially and simultaneously also into a second circular cavity in the form of a groove 16 provided on the inside face of the axial hole in the solenoid 5 and which can be arranged opposite the groove 15.

The respective locations of these two grooves 15, 16 are suited in height so that the two grooves are positioned one facing the other when the solenoid 5 comes into abutment against the collar 7. The split ring 14 then provides the connection between the solenoid and the housing, and in this manner axial locking of the solenoid 5 is also obtained.

In order to offer sufficient resistance to shear forces, the split ring 14 is preferably made of metal. This ring preferably has a circular section, which facilitates fitting, but it can also have a rectangular section.

In this last case, the edge at the tip of the end 4 of the housing 3 is advantageously bevelled to facilitate fitting.

Before fitting, the split ring 14 has an external diameter greater than the diameter of the axial hole 6 in the housing 3, in order to be able to extend simultaneously into the first and second grooves 15, 16 after the fitting operation. Moreover, the depth of one of the first and second grooves 15, 16 is at least equal to the thickness of the ring in order to allow this to be retracted elastically into it during the fitting operation, while to obtain an axial locking effect, the depth of the other groove (15 or 16) is less than the thickness of the ring so that the outer periphery of the ring 14 can project from the groove of lesser depth to thus penetrate slightly into the other groove when the two grooves 15, 16 are placed one opposite the other and the ring is biased towards the bottom of the groove of lesser depth in the manner which will be explained below.

To fit the solenoid 5 on the valve housing 3, it is only necessary to place the split ring 14 in the one of the first and second grooves 15, 16 which has a depth at least equal to the thickness of the split ring 14, to align this axial hole with the end 4 of the valve housing 3, to introduce this end into the axial hole and to push the solenoid to displace it axially towards the collar 7 forming a stop on the housing.

In the case in which the first groove 15 on the housing 3 has a depth suited to receive the split ring 14 at the start of the fitting operation, the ring will be elastically radially inwardly deformed in it to be retracted entirely into this groove 15 when it comes into contact with the edge around the axial hole 6 in the solenoid 5.

In the case in which the second groove 16 in the axial hole 6 in the solenoid 5 has a depth suitable to receive the split ring 14 at the start of the fitting operation (see FIGS. 3 and 4), the ring will be elastically radially outwardly deformed in it to be entirely retracted into this groove 16 when it comes into contact with the peripheral edge of the end 4 of the housing 3.

In the one case as in the other, the split ring will remain retracted into the corresponding groove 15 or 16 until the two grooves 14, 15 are arranged one opposite the other. At this moment, the split ring 14 will readopt its original shape to extend simultaneously into the two grooves.

In order to eliminate any play which could remain between the end face 17 of the solenoid 5 and the collar, in accordance with an important characteristic of the invention, the first connecting means are associated with an elastically compressible intermediate ring 18 arranged around the housing 3 of the electrically operated valve, between a first contact surface 32 on the collar 7 and a second opposed annular contact surface 19 on this end 17 of the solenoid, around the axial hole 6.

On fitting of the solenoid 5 on the valve housing 3, this elastically compressible intermediate ring 18 is compressed so as to eliminate any play in the first connecting means by biasing the solenoid outwardly. This biasing will have the effect of one of the edges defining the second groove 16 (see FIG. 4) pushing the split ring radially towards the inside of the first groove until it comes into abutment against the bottom of this. In this position, the solenoid 5 is entirely axially locked.

The elastically compressible intermediate ring 18 is advantageously sufficiently compressed between the first contact surface 32 of the collar 7 and the second contact surface 19 of the solenoid 5 to simultaneously form a means for locking the solenoid in rotation around the valve housing 3. This ring 18 is preferably made of a material allowing the ring to also form an efficient seal. Thus, the intermediate elastic ring 18 has three different functions: taking up play, locking in rotation and sealing.

In order to be able to change the solenoid 5 should there be need, it is necessary to be able to remove it from the valve housing 3. To allow removal, the wall 20 in the solenoid separating the second groove 16 from the annular contact surface 19 is sufficiently thin for removal of the solenoid to be able to be accomplished by forcing the solenoid outwardly so as to deform the wall by means of the split ring.

Figure 6:
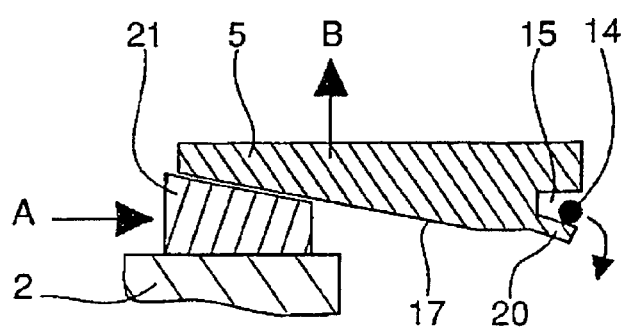
FIG. 6 is a very diagrammatic view of removal of the solenoid from the housing of the electrically operated valve.

This removal is illustrated in FIG. 6 which shows the introduction of a tool in the form of a wedge 21 between the end surface 17 of the solenoid 5 and the hydraulic unit 2. When this wedge is driven in the direction of the horizontal arrow A, a force component will act in the direction of the vertical arrow B to displace the solenoid outwardly, deforming the wall 20 by means of the split ring 14 which is axially locked in the first and second grooves 15, 16.

In order to facilitate this removal in case of changing the solenoid, the end face 17 of the solenoid 5 is preferably generally in the form of a truncated cone to offer a better contact surface to the upper inclined surface on the wedge 21 shown in FIG. 6.

The solenoid 5 is advantageously provided with a protective casing 22 which encloses it on all sides, leaving free only a zone around the axial hole 6 and which, due to the presence of the intermediate ring 18, makes the whole assembly sealed so that no anti-corrosion treatment of the metal surfaces is any longer necessary.

This casing 22 can be made of a malleable amagnetic metal and have a generally cylindrical tubular shape, closed at one of its ends and crimped on the solenoid 5 at the opposite end.

By way of modification, this casing can be made of a plastics material quite simply over-moulded on the solenoid.

FIGS. 7 and 8 show an embodiment in accordance with the invention of the second connecting means of the housing 3 to the hydraulic unit 2.

Figure 4:
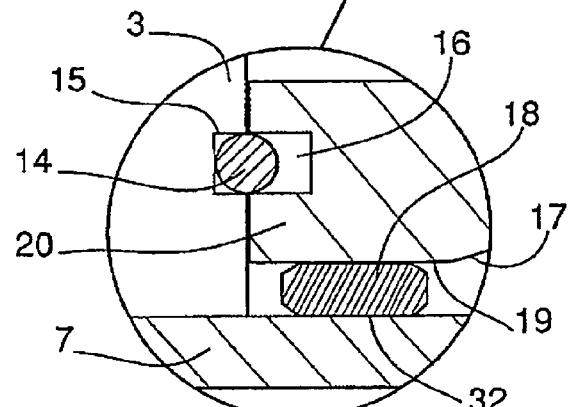
FIG. 4 is a view in section to a larger scale of some details circled in FIG. 3.
Figure 5:
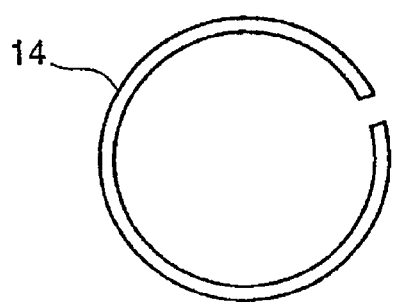
FIG. 5 is a view in plan of a split ring of the axial locking means in accordance with the invention.

In the embodiment shown in FIG. 7, the first means for connection between the housing and the solenoid are conventional and correspond to those shown in FIG. 1, while the second connecting means of the housing 3 to the hydraulic unit 3 include similar elements to those described with reference to the first connecting means, such as shown in FIGS. 3 and 4.

In this embodiment, the second connecting means include a split ring 14 arranged in a first circular cavity 33 provided on the periphery of the housing 3 and more precisely on the upper face of a collar 34 of the latter. A second circular cavity 35 in the form of a groove is provided on the inside face of the hole forming a port 25.

The hole forming a port 25 has a larger diameter close to its opening to the outside face of the hydraulic unit so as to define an annular shoulder 36 inside this hole.

The collar 34 is introduced into this hole and defines on its lower face a first contact surface 37 for an elastically compressible intermediate ring 18 arranged around the housing 3. A second contact surface 38 opposite to the first is defined by the shoulder 36 inside the hole forming a port 25 in order to compress the ring 18 between them on introduction of one of the ends of the housing 3 into this hole forming a port.

The ring 14 is suitable to be partially housed in the second circular cavity inside the hole forming a port and simultaneously in the first circular cavity 33 on the upper face of the collar 34, so as to connect the housing 3 to the hydraulic unit 2 while compressing the intermediate ring 18.

In this embodiment, the solenoid 5 rests directly against the outside face of the hydraulic unit 2, with interposition of a second elastically compressible intermediate ring 18'. This second ring 18' is arranged around the housing and compressed between first and second opposed contact surfaces facing one another, the first being provided on the solenoid 5 around the central hole 6 in this, and the second on the hydraulic unit 2, around the hole forming a port 25 in this.

A more compact structure is thus obtained than that of a conventional electrically operated valve after fitting to a hydraulic unit.

FIG. 8 shows another embodiment of the electrically operated valve in accordance with the invention in which the first connecting means of the solenoid 5 to the housing 3 of the electrically operated valve 1 are the same as those described with reference to FIG. 3, while the second connecting means of the housing 3 to the hydraulic unit 2 are the same as those described with reference to FIG. 7. This is a particularly advantageous combination of these first and second connecting means in accordance with the invention.

Lastly, FIG. 9 shows a modification of the embodiments of FIGS. 7 and 8, in which the first circular cavity is defined by a groove 33' on the peripheral face of the collar 34 of the housing 3.

Of course, the invention is not limited to the examples shown and described and the man skilled in the art will be able to make modifications to them without thereby departing from the scope of the invention.

I claim:

1. An assembly comprising a hydraulic unit having a port and an electrically operated valve, the electrically operated valve comprising a substantially cylindrical housing having an end, and a solenoid having an axial hole receiving the end, said assembly further comprising connecting means for connecting the housing to one of said hydraulic unit or said solenoid, said connecting means comprising:
   a first circular cavity formed in the housing;
   a second circular cavity formed in one of said axial hole in the solenoid and said port in the hydraulic unit;
   a split ring disposed in the first circular cavity and extending partially and simultaneously into the second circular cavity so as to connect the housing to one of the solenoid and the hydraulic unit; and
   an elastically compressible intermediate ring for biasing said solenoid away from said hydraulic unit, said elastically compressible intermediate ring arranged around said housing and axially compressed between first and second contact surfaces arranged in facing relationship, said first surface being associated with said housing, and said second contact surface being disposed on one of said solenoid and the hydraulic unit
   wherein said first and second cavities are first and second grooves, and wherein the second groove is separated from the second contact surface by a wall sufficiently thin to allow removal of the solenoid by forcing the solenoid outwardly so as to deform said wall by means of said split ring and wherein the second contact surface of the solenoid is generally in the form of a truncated cone and adapted to co-operate with a wedge.

2. An assembly in accordance with claim 1, wherein the housing comprises a collar that includes the first contact surface, and the solenoid comprises the second contact surface disposed about the axial hole.

3. An assembly in accordance with claim 1, wherein the housing comprises a collar that is received in the port and includes the first contact surface, and the port includes an annular shoulder that forms the second contact surface.

4. An assembly in accordance with claim 3, further comprising a second elastically compressible intermediate ring arranged around the housing and able to be compressed between a contact surface on the solenoid about the axial hole and a contact surface on the hydraulic unit about the port, said contact surfaces being in facing relationship.

5. An assembly in accordance with claim 3, wherein the first circular cavity is defined by the collar of the housing.

6. An assembly in accordance with claim 3, wherein the first circular cavity is defined by a groove in a peripheral face of the collar of the housing.

7. An assembly in accordance with claim 1, wherein split ring is a metal ring.

8. An assembly in accordance with claim 1, wherein said split ring has a circular section.

9. An assembly in accordance with claim 1, wherein the solenoid is covered by a protective casing.

10. An assembly in accordance with claim 9, wherein the casing is made of a malleable amagnetic metal and has a generally cylindrical tubular shape that includes one end that is closed and an opposite end that is crimped.

11. An assembly in accordance with claim 9, wherein the casing is made of a plastics material over-moulded on the solenoid.

* * * * *

UNITED STATES PATENT AND TRADEMARK OFFICE
CERTIFICATE OF CORRECTION

PATENT NO. : 7,618,018 B2  Page 1 of 1
APPLICATION NO. : 11/339287
DATED : November 17, 2009
INVENTOR(S) : Christophe Cardon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this

Nineteenth Day of October, 2010

David J. Kappos
*Director of the United States Patent and Trademark Office*